US008818940B2

(12) United States Patent
Lai et al.

(10) Patent No.: US 8,818,940 B2
(45) Date of Patent: Aug. 26, 2014

(54) SYSTEMS AND METHODS FOR PERFORMING RECORD ACTIONS IN A MULTI-TENANT DATABASE AND APPLICATION SYSTEM (75) Inventors: Sanjaya Lai, South San Francisco, CA (US); Kedar Doshi, Palo Alto, CA (US); Yamuna Esaiarasan, Fremont, CA (US); Chaitanya Bhatt, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 321 days.

(21) Appl. No.: 13/074,809

(22) Filed: Mar. 29, 2011

(65) Prior Publication Data
US 2012/0254221 A1 Oct. 4, 2012

(51) Int. Cl.
*G06F 17/30* (2006.01)

(52) U.S. Cl.
USPC .......................................... 707/618; 707/609

(58) Field of Classification Search
CPC .................................. G06F 17/30; G06F 9/546
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |

(Continued)

OTHER PUBLICATIONS

Linear Combination—Wikipedia (http://en.wikipedia.org/wiki/Linear_Combination (accessed Jul. 16, 2012).

(Continued)

*Primary Examiner* — Yuk Ting Choi
(74) *Attorney, Agent, or Firm* — Ingrassia Fisher & Lorenz, P.C.

(57) ABSTRACT

A system and method for executing record actions in a multi-tenant database and application service is provided. The system and method is configured to provide a message queue and an event queue, the message queue configured to store a plurality of messages corresponding to record actions and the event queue configured to store a corresponding list of events. The system and method are configured to process record actions on the plurality of records by selecting a plurality of messages in the message queue for processing, the selected plurality of messages corresponding to a plurality of record actions on records in the multi-tenant database, identifying a plurality of events in the event queue corresponding to the selected plurality of messages, and processing the identified plurality of events as a batch to execute the plurality of record actions.

6 Claims, 3 Drawing Sheets

(56) References Cited

U.S. PATENT DOCUMENTS

| | | |
|---|---|---|
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,281,022 B2 | 10/2007 | Gruhl et al. |
| 7,340,411 B2 | 3/2008 | Cook |
| 7,373,599 B2 | 5/2008 | McElfresh et al. |
| 7,406,501 B2 | 7/2008 | Szeto et al. |
| 7,426,557 B2 | 9/2008 | Gruhl et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,685,091 B2 | 3/2010 | Boone et al. |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,933,843 B1 | 4/2011 | von Groll et al. |
| 7,945,653 B2 | 5/2011 | Zuckerberg et al. |
| 7,970,895 B2 | 6/2011 | Gruhl et al. |
| 7,974,983 B2 | 7/2011 | Goeldi |
| 7,991,764 B2 | 8/2011 | Rathod |
| 8,005,896 B2 | 8/2011 | Cheah |
| 8,010,539 B2 | 8/2011 | Blair-Goldensohn et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0256905 A1 | 11/2005 | Gruhl et al. |
| 2005/0256949 A1 | 11/2005 | Gruhl et al. |
| 2006/0168013 A1* | 7/2006 | Wilson et al. .................. 709/206 |
| 2006/0200444 A1* | 9/2006 | Bracho et al. .................. 707/1 |
| 2006/0284873 A1 | 12/2006 | Forrest et al. |
| 2007/0214097 A1 | 9/2007 | Parsons et al. |
| 2007/0233656 A1 | 10/2007 | Bunescu et al. |
| 2007/0239452 A1 | 10/2007 | Madhavan et al. |
| 2008/0010270 A1 | 1/2008 | Gross |
| 2008/0082399 A1 | 4/2008 | Noble et al. |
| 2008/0082586 A1* | 4/2008 | Jasik et al. .................. 707/200 |
| 2008/0147487 A1 | 6/2008 | Hirshberg |
| 2008/0154798 A1 | 6/2008 | Valz |
| 2008/0209320 A1 | 8/2008 | Mawhinney et al. |
| 2008/0228695 A1 | 9/2008 | Sifry et al. |
| 2008/0288516 A1 | 11/2008 | Hadfield |
| 2009/0018996 A1 | 1/2009 | Hunt et al. |
| 2009/0138427 A1 | 5/2009 | Kalavade |
| 2009/0204507 A1 | 8/2009 | Cockayne et al. |
| 2009/0222743 A1 | 9/2009 | Hadfield |
| 2009/0319518 A1 | 12/2009 | Koudas et al. |
| 2010/0063877 A1 | 3/2010 | Soroca et al. |
| 2010/0063959 A1* | 3/2010 | Doshi et al. .................. 707/618 |
| 2010/0070485 A1 | 3/2010 | Parsons et al. |
| 2010/0088234 A1 | 4/2010 | Moore et al. |
| 2010/0094878 A1 | 4/2010 | Soroca et al. |
| 2010/0125502 A1 | 5/2010 | Solomon et al. |
| 2010/0217757 A1 | 8/2010 | Fujioka |
| 2010/0241576 A1 | 9/2010 | Beeri |

(56) References Cited

U.S. PATENT DOCUMENTS

| | | |
|---|---|---|
| 2010/0274815 A1 | 10/2010 | Vanasco |
| 2011/0041153 A1 | 2/2011 | Simon et al. |
| 2011/0055194 A1* | 3/2011 | Ghosh .......................... 707/709 |
| 2011/0209067 A1 | 8/2011 | Bogess et al. |
| 2011/0246816 A1 | 10/2011 | Hsieh et al. |
| 2011/0258204 A1 | 10/2011 | Hubbard et al. |
| 2012/0296920 A1 | 11/2012 | Sahni et al. |

OTHER PUBLICATIONS

Final Office Action for U.S. Appl. No. 12/437,418, mailed Apr. 16, 2012.
Final Office Action for U.S. Appl. No. 12/356,429, mailed May 2, 2012.
Notice of Allowance for U.S. Appl. No. 12/819,402, mailed May 14, 2012.
Non-Final Office Action for U.S. Appl. No. 13/453,802, mailed Jun. 8, 2012.
U.S. Appl. No. 13/478,002, filed May 22, 2012.
United States Patent Office, US Non-Final Office Action for U.S. Appl. No. 12/278,277 dated Sep. 14, 2012.
USPTO, Notice of Allowance, for U.S. Appl. No. 13/526,246, mailed Feb. 14, 2013.
USPTO, Notice of Allowance, for U.S. Appl. No. 12/356,429, mailed Feb. 15, 2013.

* cited by examiner

SYSTEMS AND METHODS FOR PERFORMING RECORD ACTIONS IN A MULTI-TENANT DATABASE AND APPLICATION SYSTEM

TECHNICAL FIELD

The following relates to data processing systems and processes, and more particularly relates to systems and processes for processing record actions for multiple tenants in a multi-tenant database system environment.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant platforms can facilitate effective collaboration between users, including between users in different tenants. One way that multi-tenant platforms facilitate effective collaboration is by providing for the controlled sharing of data between tenants. For example, one organization may elect to share various types of product information with other tenants as a way to facilitate cooperation on a host of issues. Multi-tenant platforms may facilitate such sharing data though the controlled sharing of selected records. When a selected record is shared, a connection is made from the originating tenant to the target tenant, allowing the target tenant to access the record.

One issue that arises with such sharing of records occurs when such records are updated or otherwise changed. Specifically, when a record is changed there is typically a need to update that record for all users with which that record has been shared. When large numbers of records are shared with large numbers of users, such updating of records may be very resource intensive. In some cases, the wait for such an updating to occur may be significant. Furthermore, users with large numbers of shared records and correspondingly large numbers of updates to shared records can hog resources and delay processing for other users. Thus, there remains a continuing need for systems methods for sharing and updating of records between tenants that improve the processing performance of such sharing.

DESCRIPTION OF THE DRAWING FIGURES

Exemplary embodiments will hereinafter be described in conjunction with the following drawing figures, wherein like numerals denote like elements.

DETAILED DESCRIPTION

According to various exemplary embodiments, systems and methods are provided to effectively processing record actions in multi-tenant database system. This facilitates improved sharing of records between users of different tenants in the multi-tenant system.

Figure 1:
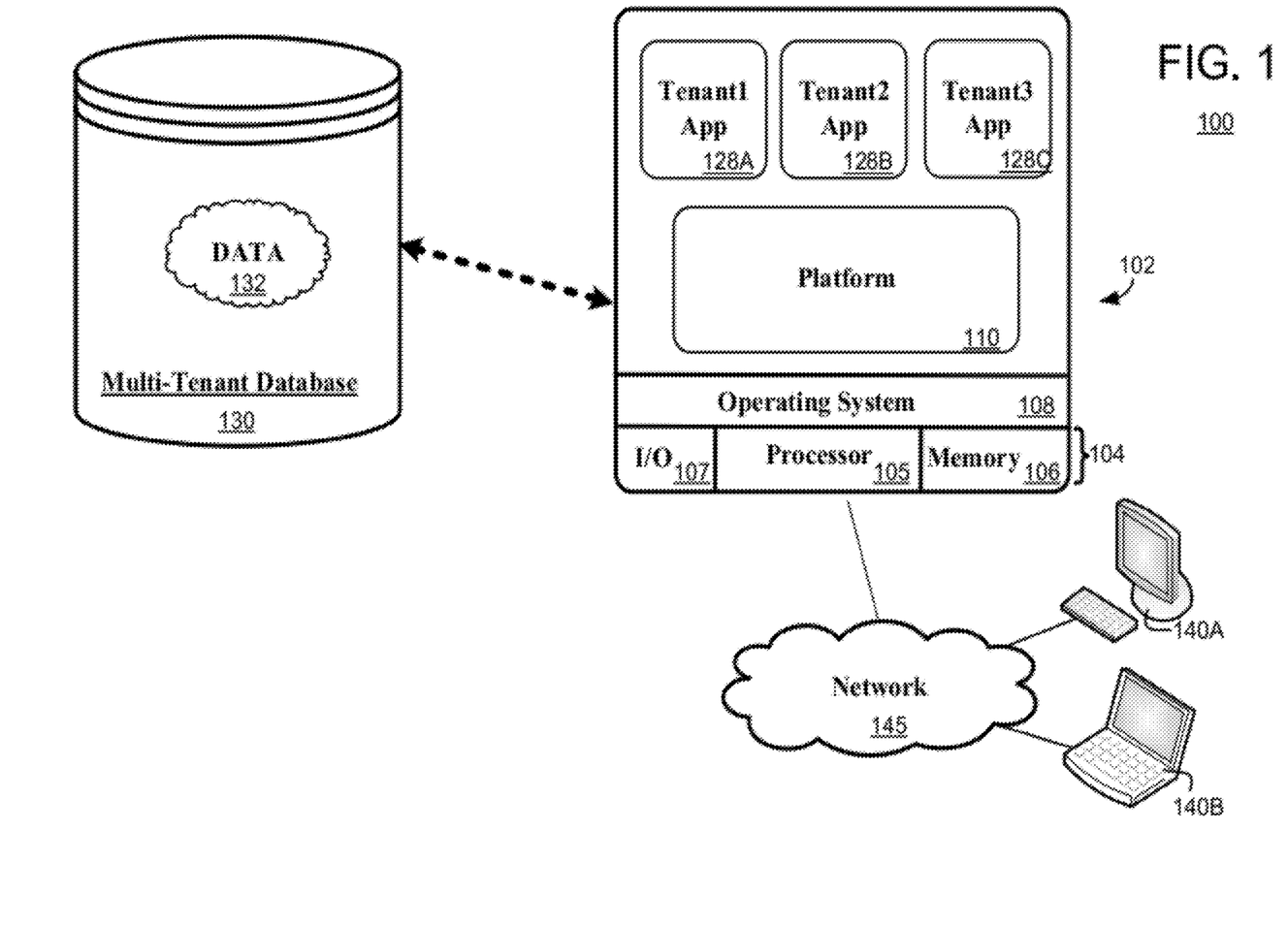
FIG. 1 is a block diagram of an exemplary multi-tenant data processing system.

Turning now to FIG. 1, an exemplary multi-tenant application system 100 suitably includes a server 102 that dynamically creates virtual applications 128A-B based upon data 132 from a common database 130 that is shared between multiple tenants. In general, "tenant" generally refers to a group of users that shares access to common data within database 130. Likewise, the server 102 may be referred to as, for example, an origin application server. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein.

Server 102 is implemented using one or more actual and/or virtual computing systems that collectively provide a dynamic application platform 110 for generating virtual applications 128A-C. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform 110 gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

As noted above, a "tenant" generally refers to a group of users that shares access to common data within database 130. Tenants may represent customers, customer departments, business or legal organizations, and/or any other entities that maintain data for particular sets of users within system 100.

Although multiple tenants may share access to a common server 102 and database 130, the particular data and services provided from server 102 to each tenant can be securely isolated from those provided to other tenants, as described more fully below. The multi-tenant architecture therefore allows different sets of users to share functionality without necessarily sharing each other's data 132.

Furthermore, the multi-tenant architecture may be configured to allow selective sharing of data between users. In such implementations, individual records in data 132 may be shared with other users, thus facilitating various types of cooperation between tenants in the multi-tenant system. For example, one organization may elect to share various types of sales and product information in data 132 with other tenants as a way to facilitate cooperation between customers and clients. The server 102 may be configured to facilitate sharing of such on a record by record basis. When a selected record is shared, a connection is made from the originating tenant to the target tenant, allowing the target tenant to access the record. The connection allows the target tenant to access a copy of the record, and also provides for the updating of the copy when the originating tenant updates the record.

Figure 2:
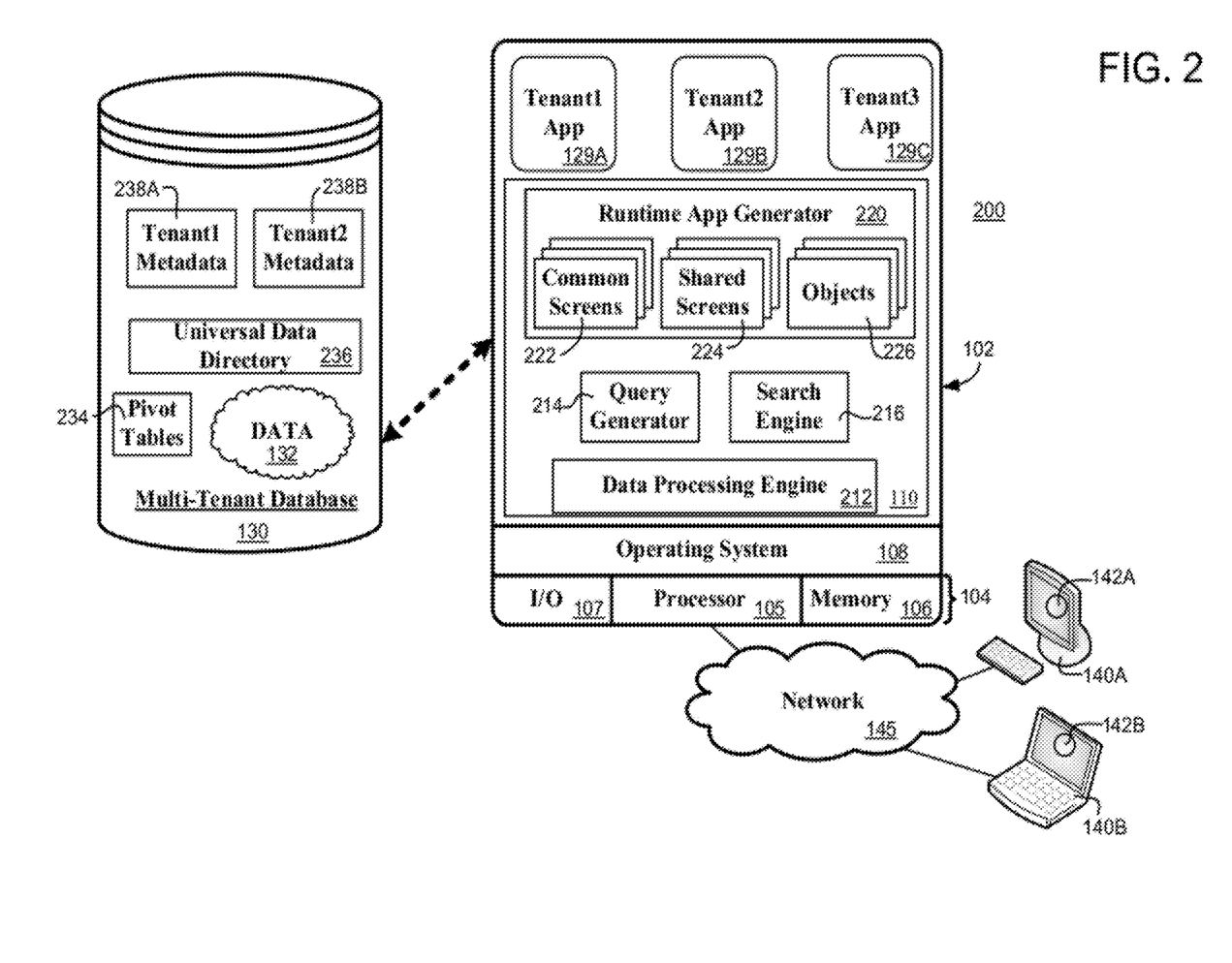
FIG. 2 is a block diagram of another exemplary multi-tenant data processing system.

FIG. 2 illustrates another exemplary multi-tenant application system 200 in accordance with an embodiment. The multi-tenant application system 200 includes client devices 140A-B. The multi-tenant application system 200 further includes a server 102 that dynamically creates virtual applications 129A-C based upon data 132 from a common database 130 that is shared between multiple tenants. Data and services generated by the virtual applications 129A-C are provided via network 145 to any number of client devices 140A-B, as desired. Each virtual application 129A-C is suitably generated at run-time using a common platform 110 that securely provides access to data 132 in database 130 for each of the various tenants subscribing to system 100.

Data 132 may be organized and formatted in any manner to support multi-tenant application platform 110. In various embodiments, data 132 is suitably organized into a relatively small number of large data tables to maintain a semi-amorphous "heap"-type format. Data 132 can then be organized as needed for a particular virtual application 129A-C. In various embodiments, conventional data relationships are established using any number of pivot tables 234 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 236, for example, can be used to describe any number of forms, reports, workflows, user access privileges, business logic and other constructs that are common to multiple tenants. Tenant-specific formatting, functions and other constructs may be maintained as tenant-specific metadata 238A-B for each tenant, as desired. Rather than forcing data 132 into an inflexible global structure that is common to all tenants and applications, then, database 130 is organized to be relatively amorphous, with tables 234 and metadata 236-238 providing additional structure on an as-needed basis. To that end, application platform 110 suitably uses tables 234 and/or metadata 236, 238 to generate "virtual" components of applications 129A-C to logically obtain, process, and present the relatively amorphous data 132 from database 130.

Application platform 110 is any sort of software application or other data processing engine that generates virtual applications 129A-C that provide data and/or services to client devices 140A-B. Virtual applications 129A-C are typically generated at run-time in response to queries received from client devices 140A-B. In the example illustrated in FIG. 2, application platform 110 includes a bulk data processing engine 212, a query generator 214, a search engine 216 that provides text indexing and other search functionality, and a runtime application generator 220. Each of these features may be implemented as a separate process or other module, and many equivalent embodiments could include different and/or additional features, components or other modules as desired.

Runtime application generator 220 dynamically builds and executes virtual applications 129A-C in response to specific requests received from client devices 140A-B. Virtual applications 129A-C created by tenants are typically constructed in accordance with tenant-specific metadata 238, which describes the particular tables, reports, interfaces and/or other features of the particular application. In various embodiments, each virtual application 129A-C generates dynamic web content that can be served to a browser or other client program 142A-B associated with client device 140A-B, as appropriate.

Application generator 220 suitably interacts with query generator 214 to efficiently obtain multi-tenant data 132 from database 130 as needed. In a typical embodiment, query generator 214 considers the identity of the user requesting a particular function, and then builds and executes queries to database 130 using system-wide metadata 236, tenant specific metadata 238, pivot tables 234 and/or any other available resources. Query generator 214 in this example therefore maintains security of the multi-tenant database 130 by ensuring that queries are consistent with access privileges granted to the user that initiated the request.

Data processing engine 212 performs bulk processing operations on data 132 such as uploads or downloads, updates, online transaction processing and/or the like. In many embodiments, less urgent bulk processing of data 132 can be scheduled to occur as processing resources become available, thereby giving priority to more urgent data processing by query generator 214, search engine 216, virtual applications 129A-C and/or the like. Again, the various components, modules and inter-relationships of other application platforms 120 may vary from the particular examples described herein.

In operation, then, developers use application platform 110 to create data-driven virtual applications 129A-C for the tenants that they support. Such applications 129A-C may make use of interface features such as tenant-specific screens 224, universal screens 222 or the like. Any number of tenant-specific and/or universal objects 226 may also be available for integration into tenant-developed applications 129A-C. Data 132 associated with each application 129A-C is provided to database 130, as appropriate, and stored until requested, along with metadata 138 that describes the particular features (e.g., reports, tables, functions, etc.) of tenant-specific application 129A-C until needed.

Data and services provided by server 102 can be retrieved using any sort of personal computer, mobile telephone, tablet or other network-enabled client device 140 on network 145. Typically, the user operates a conventional browser or other client program 242 to contact server 102 via network 145 using, for example, the hypertext transport protocol (HTTP) or the like. The user typically authenticates his or her identity to the server 102 to obtain a session identification ("SessionID") that identifies the user in subsequent communications with server 102. When the identified user requests access to a virtual application 129A-C, application generator 220 suitably creates the application at run time based upon metadata 236 and 238, as appropriate. Query generator 214 suitably obtains the requested data 132 from database 130 as needed to populate the tables, reports or other features of virtual application 129A-C. As noted above, the virtual application 129A-C may contain Java, ActiveX or other content that can be presented using conventional client software 142A-B running on client device 140A-B; other embodiments may simply provide dynamic web or other content that can be presented and viewed by the user, as desired.

The virtual applications 129A-C may access the common database 130. Using any number of client devices 140A-B, users may the virtual applications 129A-C and the common database 130 via network 145. Again, the common platform 10 provides secure access to contact database in database 130 for each of the various tenants subscribing to system 100.

In some embodiments, a plurality of such servers 102 may be communicably coupled to the multi-tenant database 130 and have access to data 132 and tenant metadata 238. In certain embodiments, each server 132 is configured to handle requests for any user associated with any organization that is a tenant. Because it may desirable to be able to add and remove servers 132 from the server pool at any time for any reason, there is preferably no server affinity for a user and/or organization to a specific server 132. In this manner, system 200 is multi-tenant, wherein system 200 handles storage of, and access to, different objects, data and applications across disparate users and organizations.

As an example of storage, one tenant might be a company that employs a sales force where each salesperson uses system 200 to manage their sales process. Thus, a user might maintain contact data, leads data, customer follow-up data, performance data, goals and progress data, etc., all applicable to that user's personal sales process (e.g., in tenant1 meta data 238A). In an example of a multi-tenant system arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 102 that are allocated at the tenant level while other data structures might be managed at the user level. Because a multi-tenant system might support multiple tenants including possible competitors, the multi-tenant system should have security protocols that keep data, applications, and application use separate. Also, because many tenants may opt for access to an multi-tenant system rather than maintain their own system, redundancy, up-time, and backup are additional functions that may be implemented in the multi-tenant system. In addition to user-specific data and tenant specific data, multi-tenant system 100 might also maintain system level data usable by multiple tenants or other data. Such system level data might include industry reports, news, postings, and the like that are sharable among tenants.

In certain embodiments, client devices 140A-B communicate with servers 102 to request and update system-level and tenant-level data that may require sending one or more queries to the multi-tenant database 130.

In one embodiment, the database 130 may generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

As noted above, multiple tenants may share access to a common server 102 and database 130. And while data and services provided from server 102 to each tenant can be securely isolated from those provided to other tenants, in some cases it may be desirable to facilitate sharing of data between tenants. In such embodiments records may be shared by allowing "source" tenants to send selected records to selected other tenants. These "target" tenants have the ability to select which records they will accept. When such records are accepted copies of the accepted records are inserted into the target tenant's data. Furthermore, "connections" between these newly inserted records and the original source records are created.

These connections between the original record and the new record in the target tenant data allow updates in the source tenant's records to also be made in the receiving tenant's records. For example, when a source tenant updates a record containing product information with new specifications, those new specifications may be automatically updated in the target tenant's record as long as the connection between records remains. Likewise, new records, or deletions of records will likewise create changes in the receiving tenant's data. It should be noted that in a typical implementation millions of records may be shared between tenants. Furthermore, each record may be shared to and received by multiple different target tenants. With such large numbers of records being created, shared and updated, significant processing resources may be required for even relatively small record updates.

This is particularly true for updates of records that are shared with many different target tenants. However, other such record actions may also require significant processing resources depending largely upon the number of records and connections. In general, the processing of such record actions involves the creation and processing of "events" that define the type of parameters of the record action to be performed. Furthermore, these events have been commonly processed simply in the order created, without regard to the other related events.

To facilitate the performance these resource intensive record actions, the embodiments described here provide systems and methods that utilize a message queue and an event queue to selectively process record actions. The message queue is configured to store messages that correspond to records actions, and the event queue is configured to store corresponding events. So configured, record actions such as record updates are processed in bulk by selecting a plurality of messages in the message queue, identifying a plurality of events corresponding to the plurality of selected messages, and batch processing the plurality of events to execute the plurality of record actions. As will be described in greater detail below, this technique for processing record actions allows for large number of record updates to be performed without excessively interfering with other processing actions. For example, by batch processing record actions by source tenant and/or connection together in one batch, and then processing record actions for other tenants and/or other connections in later batches. As will be described in greater detail below, this selective batch processing of record actions based on tenant and connection can conserve computing resources and improve response times.

Figure 3:
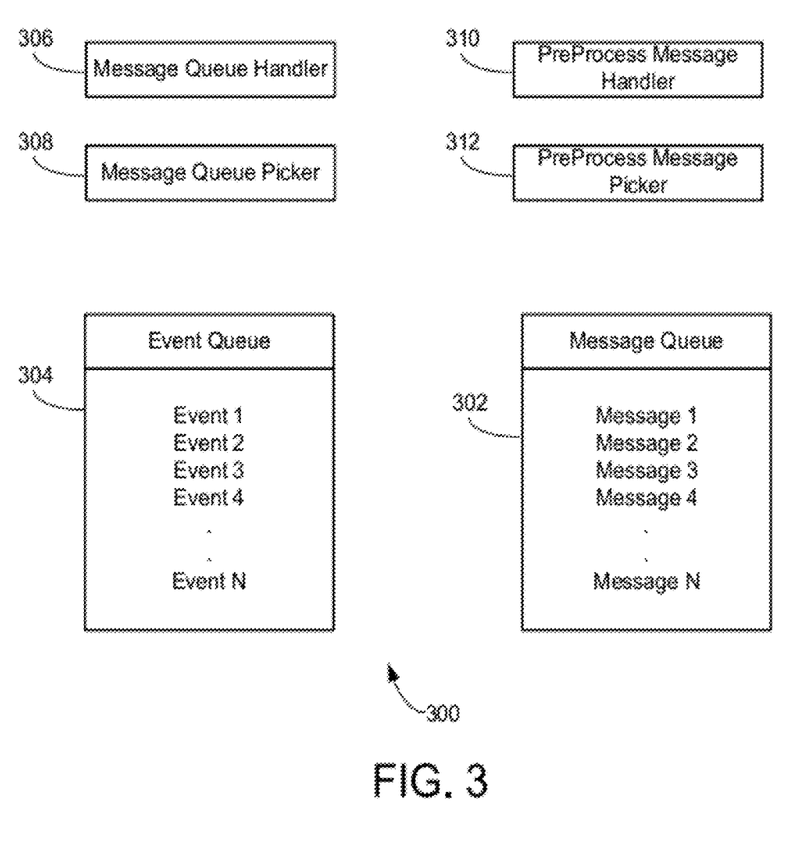
FIG. 3 is schematic diagram of a system 300 for performing record actions on data in a multi-tenant database and application service.

Turning now to FIG. 3, a system 300 for processing record actions is illustrated schematically. The system 300 includes a message queue 302, an event queue 304, a message queue handler 306, a message queue picker 308, a preprocess message handler 310 and a preprocess message picker 312. In general, the message queue 302 is a data structure configured to store messages that correspond to record actions relating to a plurality of records in a multi-tenant database. In one embodiment the message queue 302 comprises a table having a plurality of rows, with each row identifying one or more corresponding events. The event queue 304 is likewise a data structure configured to store events for processing. In one embodiment the event queue 304 comprises a table having a plurality of rows, with each event identifying a record, an action to be performed on the record, and the target tenant of the record. The message queue 302 and event queue 304 are configured to facilitate efficient bulk processing of record actions by facilitating batch selection and batch processing of record actions in an asynchronous manner. Specifically, the message queue 302 and event queue 304 serve a highly scalable, multi-threaded delivery system for messages and events that correspond to record actions.

With respect to these embodiments, the multi-tenant database system may include any service that relies on a database system that is accessible over a network, in which various elements of hardware and software of the database system may be shared by one or more customers (e.g. tenants). For instance, a given application server may simultaneously process requests for a great number of tenants using different threads, and a given database may store data for a potentially much greater number of customers.

To this end, the message queue 302 and data queue 304 of the multi-tenant on-demand database system may include any data structure capable of queuing unprocessed messages to be processed by a server provided in the multi-tenant on-demand database system. In one embodiment, the message queue 302 may store the unprocessed messages in the order by which they have been added to the message queue 302.

As one example, the message queue 302 and event queue 304 may each include a table and the unprocessed messages and events may be stored in rows of the corresponding table.

Further, it should be noted that while the unprocessed messages in the message queue 302 are described as corresponding to events that generate specific record actions, such messages may also correspond to other tasks that are to be performed by one of the aforementioned multi-tenant database system. One specific example is in the preprocess messages used for record updates, which are described in more detail below. As other examples, the messages may include other types of actions with respect to creating, deleting, and modifying content, controlling access to contact, and other various actions that are performed in a multi-tenant database.

As noted above, the message queue 302 is configured to store messages that correspond to events, including events that initiate records actions relating to a plurality of records in a multi-tenant database. In accordance with the embodiments of the invention, these messages include record action messages and preprocess messages. When a user initiates a record action, a corresponding message with a message ID is inserted in the message queue 302.

Likewise, the event queue 304 is configured to store events that correspond to records actions relating to a plurality of records in a multi-tenant database. In accordance with the embodiments of the invention, these events may include a variety of record action events. As was noted above, when a user initiates a record action, a corresponding message is inserted in the message queue 302. Likewise, one or more corresponding events are inserted into the event queue 304. In one embodiment each message includes a message ID and each event in the event queue 304 includes an entry identifying a key of corresponding message in the message queue 302.

As noted above, multiple corresponding events may be inserted into the event queue 304 for each message in the message queue 302. This one-to-many relationship reduces the number of messages that are required to be in the message queue 302. This reduces the number of messages inserted into the message queue 302, and thus improves the performance of message queue 302. Specifically, reducing the number of messages in the message queue 302 prevents the queue 302 from flooding and decreases the time needed to query the queue 302.

It should be noted that the number of events that may be created for each message may be limited by processing constraints. In such an embodiment, each event in the event queue 304 that corresponds to the same message in the message queue 302 would have the same message ID. Thus, all of the events corresponding to the same message in the message queue 302 may be easily identified by using the message ID for each event.

The message queue picker 308 is configured to select messages in the message queue 302 for processing. In general, the message queue picker 308 is configured to bulk select messages that have common features that facilitate efficient batch processing. For example, the message queue picker 308 may be configured to select a plurality of messages from the message queue 302 that correspond to the same source tenant. In other embodiments, the message queue picker 308 may be configured to select a plurality of messages from the message queue 302 that correspond to the same source tenant and connection (i.e., to the same target tenant). In yet other embodiments, a combination may be used such that the message queue picker 308 selects those messages that correspond to both the same source tenant, same object/record type (i.e., for attachment records only) and the same connection to the target tenant.

The message queue handler 306 is called to process messages in the message queue 302. The message queue handler 306 is implemented with the ability to process multiple messages by de-queuing them as a batch using a bulk de-queue feature. As noted above, each message in the message queue 302 includes a message ID. The message queue handler 306 is configured to use the message ID to find corresponding events in the event queue 304. Additionally, the message ID identifies the corresponding source tenant and connection. The events corresponding to the batch of de-queued messages may then be processed by calling the appropriate function.

As described above, the message queue picker 308 is configured to select messages in the message queue 302 for processing. This generally involves a bulk selection of messages that have common features that lend themselves to batch processing.

In one embodiment the message queue picker 308 selects messages as follows. First, the message queue picker 308 selects the top or next message in the message queue 302. This would correspond to the oldest message in the queue when the message queue 302 is implemented with a first-in first-out data structure. Of course, in other embodiments the first message would not necessarily correspond to the oldest message in the queue. For example, in embodiments where certain messages are given priority over some older messages.

Then, with the first message selected the tenant corresponding to the first message is identified. As was noted above, in a typical embodiment the record action messages in the message queue 302 each identify a corresponding source tenant. Then, with the corresponding source tenant identified, the next step is to identify the connection corresponding to the first message. Again, in a typical embodiment the record action messages in the message queue 302 each identify a connection from the source record to a target tenant With the source tenant and connection of the first message identified, the next step is to identify other messages in the message queue that have the same source tenant are connected to the same target tenant. All such messages having the same tenant and connection as the first message (but different message IDs) may then be bulk de-queued by the message queue handler 306. It should be noted that in some cases not all messages identified as having the same corresponding tenant and connection may be de-queued at once. For example, the bulk de-queue functionality may be limited in the number of messages that may be bulk de-queued, or the size of the de-queued messages may be similarly limited.

With the plurality of messages de-queued, the events in the event queue 304 corresponding to those messages selected messages may then be identified and processed as a batch. In general, this may be done by passing the events to method in the core processing system. Events that are not successfully processed by the system may be re-enqueued into the event queue 304 along with a corresponding message in the message queue 302 for further attempts. Such messages and events may be re-enqueued several times as needed.

Thus, the system 300 is able to identify, select and process those messages that correspond to the same target tenant and connection. Such a procedure minimizes the overhead that would otherwise be required to set up multiple API sessions for the same connection. Specifically, updating records in other tenants typically involves logging into the target tenant and setting up metal data before calling an appropriate function to initiate the action. Thus, the system 300 is able to improve performance by selecting and processing messages such that events corresponding to the same tenant and connection and processed together. This may improve performance in the multi-tenant database system by reducing the need to repeatedly log into and call functions for the same target tenant.

In one embodiment, the system 300 also includes a preprocess message handler 310 and a preprocess message picker 312. In general, the preprocess message handler 310 and preprocess message picker 312 serve to reduce the delay apparent to the user that may otherwise occur when the system 300 is used to update large numbers of connected records.

The preprocess message handler 310 and preprocess message picker 312 are preferably implemented to perform specific types of record actions that update multiple records. In an update action, the records have been previously created and the connection between shared records established. However, because of the sheer number of possible shared records and the resulting number of connections, update actions may be very resource intensive and take a noticeable amount of time to complete. To alleviate the resulting delay in returning control to the user, the system 300 uses the preprocess message handler 310 and preprocess message picker 312 to initiate update actions that follow when shared records are updated.

Specifically, when an update is initiated by a user a special preprocess message is created in the message queue. The preprocess message includes an ID that identifies the record being updated, but would typically not include a specific connection ID, as one preprocess message will typically correspond to multiple connections for the record.

The preprocess message picker 312 selects preprocess messages from the message queue 302 and passes the selected preprocess messages to the preprocess message handler 310 for execution.

Selected preprocess messages are executed by the preprocess message handler 310. Specifically, the preprocess message handler 310 creates messages and events corresponding to the record updates. Specifically, the preprocess message handler 310 identifies connections corresponding to the record update and creates a message in the message queue 302 and an event in the event queue 304 for each such record update action. It should be noted that with the creation of these messages and events that control may be returned to the user after a minimal delay. Thus, control may be returned to the user after the events are created, but before all the created events corresponding to the updates are actually executed. In most embodiments there can be a significant reduction in the amount of processing that must be performed before control is returned to the user.

The created messages and events may be then processed by the message queue handler 306 and the message queue picker 308 in the same way that typical record action messages and events executed. Thus, they will be selected by the message queue picker 308 and performed by the message queue handler 306 according to the corresponding source tenant and connection. The corresponding events are thus processed and the records updated. Again, this processing of the multiple events may be accomplished in the background after the returning of control to the user.

Thus, the system 300 is able to efficiently identify and process tasks in an event queue of a multi-tenant system. It should be noted one source of improvement is the ability to use multiple different servers, each with multiple different threads to process events in the event queues. This may greatly improve the performance of the system.

Generally speaking, the various functions and features of system 300 may be carried out with any sort of hardware, software and/or firmware logic that is stored and/or executed on any platform. Some or all of the functionality of system 300 may be carried out, for example, by logic executing within system 100 in FIG. 1. For example, various functions shown in FIG. 3 may be implemented using software or firmware logic that is stored in memory 106 and executed by processor 105 as part of application platform 110. The particular hardware, software and/or firmware logic that implements any of the various functions shown in FIG. 3, however, may vary from context to context, implementation to implementation, and embodiment to embodiment in accordance with the various features, structures and environments set forth herein. The particular means used to implement each of the various functions shown in FIG. 3, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A system comprising:
    a memory; and
    a server communicatively connected to the memory, the server providing a multi-tenant database and application service that includes a plurality of records, each of the plurality of records associated with a tenant in the multi-tenant database and including at least one connection to another tenant in the multi-tenant database, the server configured to:
        provide a message queue configured for storing messages, including record action messages and preprocess messages, wherein each of the preprocess messages identify a single record to be updated;
        provide an event queue configured for storing events; and
        process record actions on the plurality of records by:
            selecting a plurality of preprocess messages in the message queue for processing;
            processing the selected plurality of preprocess messages by:
                identifying a plurality of connections corresponding to the single record to be updated, and
                generating a plurality of record action messages in the message queue and a plurality of record action events in the event queue associated with the single record to be updated;
            returning control to a user before the generated plurality of record action events are executed, wherein execution of the generated plurality of record action events occurs in the background of the system while the user retains control of the system by:
                selecting the plurality of record action messages in the message queue for processing, the selected plurality of record action messages corresponding to a plurality of record actions to be performed based on the identified plurality of connections corresponding to the single record to be updated in the multitenant database, wherein the selected plurality of record action messages corresponds to a same source tenant and a same connection in the multi-tenant database;
                identifying the plurality of record action events in the event queue corresponding to the selected plurality of record action messages; and processing the identified plurality of record action events as a batch to execute the plurality of record actions.

2. The system of claim 1 wherein the server is configured to select the plurality of record action messages in the message queue by selecting messages that corresponding to a same source tenant in the multi-tenant database.

3. The system of claim 1 wherein the plurality of record actions include update actions on a record in the multi-tenant database.

4. The system of claim 1 wherein at least one record action message in the message queue corresponds to a plurality of record action events in the event queue.

5. The system of claim 1 wherein each record action event in the event queue identifies a corresponding message in the message queue.

6. A system comprising:
    a memory; and
    a multi-tenant database server, the multi-tenant database server communicatively connected to the memory and providing access to a plurality of records in a multi-tenant database, each of the plurality of records associated with a source tenant using the multi-tenant database and including at least one connection to target tenant using the multi-tenant database, and wherein the multi-tenant database server comprises:
        a message queue configured for storing a messages for use with the multi-tenant database, the messages including record action messages and preprocess messages,
    wherein each of the preprocess messages identify a single record to be updated;
        an event queue for storing events for use with the multi-tenant database, the events including record action events and preprocess events;
        a preprocess message picker for selecting a plurality of preprocess messages in the message queue;
        a preprocess message handler configured to process the selected plurality of preprocess events to identify a plurality of connections corresponding to the single record to be updated and to generate a plurality of record action messages in the message queue and a plurality of record action events in the event queue that correspond to the single record to be updated, and wherein the preprocess message handler is further configured to return control to a user before the generated plurality of record action events are executed;
        a message picker for selecting a subset of the plurality of record action messages in the message queue for processing, the message picker configured to select the subset of the plurality of record action messages by selecting messages corresponding to a same source tenant and a same connection; and a message handler, the message handler configured to identify a plurality of record action events in the event queue corresponding to the selected subset of the plurality of record action messages and process the identified plurality of record action events as a batch to execute a plurality of record actions;

wherein the message picker is configured to select the subset of the plurality of record action messages, and the message handler is configured to identify and process the plurality of record action events, as background operations in the system after control is returned to the user.

\* \* \* \* \*